United States Patent [19]

Branscome

[11] Patent Number: 4,837,254

[45] Date of Patent: Jun. 6, 1989

[54] POLY(1,4-CYCLOHEXYLENE DIMETHYLENE TEREPHTHALATE) MOLDING COMPOSITIONS

[75] Inventor: Larry W. Branscome, Kingsport, Tenn.

[73] Assignee: Eastman Kodak Company, Rochester, N.Y.

[21] Appl. No.: 162,848

[22] Filed: Mar. 2, 1988

[51] Int. Cl.$^4$ .......................... C08K 5/12; C08K 5/05; C08K 3/10; C08K 3/08

[52] U.S. Cl. .................... 523/455; 523/456; 523/460; 524/411; 524/412; 524/605

[58] Field of Search ................ 523/460, 455, 456; 524/411, 412, 605

[56] References Cited

U.S. PATENT DOCUMENTS

| | | |
|---|---|---|
| 3,329,740 | 7/1967 | Battersby . |
| 3,356,646 | 12/1967 | Wynstra et al. . |
| 3,368,995 | 2/1968 | Furukawa et al. . |
| 3,435,022 | 3/1969 | Voltz . |
| 3,435,093 | 3/1969 | Cope . |
| 3,516,957 | 6/1970 | Gray, Jr. et al. . |
| 3,814,725 | 6/1974 | Zimmerman et al. . |
| 3,951,905 | 4/1976 | Sano et al. . |
| 3,962,174 | 6/1976 | Berardinelli . |
| 3,971,752 | 7/1976 | Aoyama et al. . |
| 4,008,199 | 2/1977 | Gall . |
| 4,010,145 | 3/1977 | Russin et al. . |
| 4,172,824 | 10/1979 | Harrington, Jr. et al. . |
| 4,223,125 | 9/1980 | Bier et al. ...................... 528/305 |
| 4,246,378 | 1/1981 | Kometani et al. ............... 525/438 |
| 4,338,243 | 7/1982 | Hecht et al. .................... 524/287 |
| 4,351,757 | 9/1982 | Hoeschele ....................... 524/169 |
| 4,352,904 | 10/1982 | Deyrup ............................ 524/292 |
| 4,357,268 | 11/1982 | Vanderkooi, Jr. ............... 524/285 |
| 4,368,285 | 1/1983 | Coleman ........................ 524/293 |
| 4,385,144 | 5/1983 | Jones et al. ..................... 524/114 |
| 4,440,889 | 4/1984 | Hergenrother et al. ........ 524/143 |
| 4,451,606 | 5/1984 | Campbell ....................... 524/445 |
| 4,483,955 | 11/1984 | Christiansen et al. .......... 524/293 |
| 4,486,561 | 12/1984 | Chung et al. ................... 524/107 |
| 4,506,050 | 3/1985 | Hergenrother et al. ........ 524/143 |
| 4,535,118 | 8/1985 | Pengilly ......................... 524/398 |
| 4,539,352 | 9/1985 | Chung et al. ................... 524/109 |
| 4,548,978 | 10/1985 | Garrison, Jr. ................... 524/314 |
| 4,551,485 | 11/1985 | Ragan et al. ................... 523/212 |
| 4,609,721 | 9/1986 | Kirshenbaum et al. ........ 528/285 |

FOREIGN PATENT DOCUMENTS

| | | |
|---|---|---|
| 59-149954 | 8/1984 | Japan . |
| 1285828 | 8/1972 | United Kingdom . |
| 1298880 | 12/1972 | United Kingdom . |

*Primary Examiner*—Lewis T. Jacobs
*Attorney, Agent, or Firm*—John F. Stevens; William P. Heath, Jr.

[57] ABSTRACT

Disclosed is a polyester molding composition containing a reinforcing material and a halogenated flame retardant, the polyester containing repeat units from terephthalic acid and 1,4-cyclohexane-dimethanol, the composition further comprising an additive system which enhances the flame retardancy thereof without detrimental loss of mechanical properties, said composition characterized as having a heat deflection temperature of greater than 250° C., a tensile strength of greater than 16,000 psi, a flexural strength of greater than 21,500 psi and a notched Izod impact strength of greater than 1.5.

8 Claims, No Drawings

4,837,254

POLY(1,4-CYCLOHEXYLENE DIMETHYLENE TEREPHTHALATE) MOLDING COMPOSITIONS

TECHNICAL FIELD

This invention relates to poly(1,4-cyclohexylene dimethylene terephthalate) molding compositions containing an additive system which enhances the flame retardancy thereof without detrimental loss of mechanical properties.

BACKGROUND OF THE INVENTION

This invention is based on the discovery of flame retarded reinforced molding compositions of poly(1,4-cyclohexlene dimethylene terephthalate), sometimes referred to herein as PCT, or high melting crystalline copolymers thereof with improved mechanical properties. Generally, polyesters are flame retarded by using halogenated organic compounds in combination with antimony oxide.

Polyesters have been used as engineering plastics for mechanical parts of various machines, electrical equipment and parts of motor cars. Preferably, engineering plastics are provided with fire-proof properties, that is the flame retardancy, in addition to well-balanced ordinary physical and chemical properties. Such properties are indispensable in thermoplastic polyesters in order to enlarge their use as engineering plastics, because they are normally used at temperatures higher than 100° C.

Generally speaking, the flame retarding agents deteriorate the original physical properties of the base polymer, and therefore it is of importance to find a good combination of organic polymer and flame retarding agent. In respect to polyesters, several methods have been proposed. The use of antimony oxide in combination with brominated organic compounds is well known in the art of flame retarded polymers. Sodium antimonate used in combination with brominated organic compounds and used as a replacement for antimony oxide to flame retard poly(ethylene terephthalate) is disclosed in U.S. Pat. No. 4,338,243.

Japanese Patent Publication (Kokai) No. 46-2086 discloses combined use of decabromodiphenyl and antimony trioxide as a flame retarding agent. According to this method it is possible to give reduced flammability to a glass fiber reinforced polyester resin, but the polyester composition thus obtained is not satisfactory in many physical properties, especially heat deflection temperature, which is essential in certain applications such as electrical circuit boards, etc.

The superior improved moldability and improved properties of the molded article obtained by reinforcing poly(alkylene terephthalate) resins such as poly(ethylene terephalate) (PET) and poly(cyclohexylene dimethylene terephthalate) (PCT) has long been established (see e.g., U.S. Pat. No. 3,814,725).

It has long been known that specific nucleating agents and plasticizers when added to PET reinforced with glass fibers enhance the moldability of the composition in molds heated from 90° C. to 150° C. Patents relating to the use of dibenzoates in polyesters include U.S. Pat. Nos. 4,172,824, 3,516,957, 4,368,285, 4,223,125, 4,357,268, 4,506,050, 4,483,955, 4,440,889, 4,451,606 and 4,548,978.

Other additives of interest are disclosed in U.S. Pat. Nos. 4,357,268, 4,385,144, 4,486,561, 4,539,352 and 4,551,485. These include additives such as polyepoxies prepared from bisphenol A and epichlorohydrin, epoxidized plasticizers and organofunctional silane coupling agents.

In addition, U.S. Pat. No. 3,962,174 describes an improved thermoplastic molding resin comprising reinforced poly(butylene terephthalate) or poly(propylene terephthalate) polymers in the presence of a thermoplastic phenoxy resin.

Also, U.S. Pat. No. 4,008,199 describes stabilized poly(alkylene terephtalatate) resin compositions comprising poly(propylene terephthalate) or poly(butylene terephthalate), a reinforcing filler and a stabilizing amount of a mixture of a polyamide polymer, a phenoxy resin and an organic phosphonate.

However, there is still a need for reinforced polyesters for use in injection molding applications such as in the production of automotive and electronic parts, which have good flame retardancy as well as good mechanical and physical properties.

A problem which has existed in the past is that when flame-retarding compounds are added to reinforced molding compositions, physical properties are adversely affected. It has now surprisingly been found that when the combination of additives according to the present invention are used, flame retardant properties are achieved without the usual loss of physical properties of the molding compositions.

Copending application Ser. No. 086,997 filed Aug. 19, 1987, now U.S. Pat. No. 4,778,820, issued Oct. 18, 1988, relates to the use of a combination of powdered antimony metal with the conventionally used brominated organic compounds.

Also, copending application Ser. No. 041,505 filed Apr. 23, 1987 relates to the incorporation of a phenoxy compound in a reinforced polyester of terephthalic acid and 1,4-cyclohexanedimethanol.

DESCRIPTION OF THE INVENTION

According to the present invention, there are provided polyester molding compositions containing a reinforcing material and a halogenated flame retardant, the polyester containing repeat units from terephthalic acid and 1,4-cyclohexanedimethanol, the composition further comprising an additive system which enhances the flame retardancy thereof without detrimental loss of mechanical properties, the composition being characterized as having a heat deflection temperature of greater than 250° C., a tensile strength of greater than 16,000 psi, a flexural strength of greater than 21,500 psi, and a notched Izod impact strength of greater than 1.5 ft-lb/in.

More, particularly, the present invention provides flame-retarded, reinforced polyester molding compositions having improved physical properties comprising
  (a) a polester having repeat units from terephthalic acid and 1,4-cyclohexanedimethanol and having an I.V. of about 0.5–1.0, and
  (b) an additive system comprising
    (1) about 2–8%, based on the weight of the composition, of antimony oxide,
    (2) about 0.5–5%, based on the weight of the composition, of powdered antimony metal having a particle size of less than 500 microns,
    (3) about 5–20%, based on the weight of the composition, of an aromatic organic compound having at least one aromatic ring in which the compound has sufficient halogen bonded directly to the aromatic ring to provide flame retardant properties, and (4) about 0.5–5% by weight of the composition of a phenoxy resin having the formula

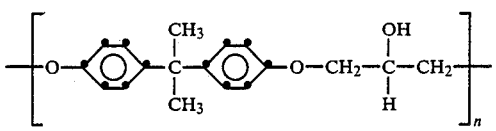

wherein n is about 50 to 200, the composition having the mechanical properties described above.

The polyester portion of the molding compositions of the present invention is prepared by conventional polycondensation procedures well known in the art. The polyester, poly(1,4-cyclohexylene dimethylene terephthalate) contains repeat units from a dicarboxylic acid component and a glycol component. The dicarboxylic acid component, a total of 100 mol %, is at least 90 mol % terephthalic acid and the glycol component, a total of 100 mol % is at least 90 mol % 1,4-cyclohexanedimethanol.

The dicarboxylic acid component may contain up to about 10 mol % of other conventional aromatic, aliphatic or alicyclic dicarboxylic acids such as isophthalic acid, naphthalenedicarboxylic acid, cyclohexanedicarboxylic acid, succinic acid, sebacic acid, adipic acid, glutaric acid, azelaic acid and the like.

The glycol component may contain up to about 10 mol % of other conventional aliphatic or alicyclic glycols such as diethylene glycol, triethylene glycol, ethylene glycol, propanediol, butanediol, pentanediol, hexanediol, and the like.

The polyesters useful in this invention can be prepared by processes well known in the art. For example, the polyesters can be prepared by direct condensation of terephthalic acid or ester interchange using dimethyl terephthalate. The essential components of the polyester, e.g., terephthalic acid or dimethyl terephthalate and 1,4-cyclohexanedimethanol are commercially available.

The polyesters and copolyesters described above should have an I.V. (inherent viscosity) of from about 0.5 to about 1.0, and a melting point of at least 265° C.

The additive system comprises an antimony oxide component of which is a commercially available material.

The additive system further comprises an aromatic organic compound having at least one aromatic ring having halogen bonded directly to the aromatic ring. The halogenated compounds are preferably brominated or chlorinated, and most preferably, brominated. The bromine content, when bromine is present, is at least 25% of the weight of the compound, and the chlorine content, when chlorine is present, is at least 40% of the weight of the compound. In addition, the flame-retardant compound should be substantially stable at up to 300° C. and should not cause degradation of polyester. When the compound contains bromine, the amount of the bromine present in the blend should preferably be between 2–12% by weight of blend, and most preferably 5–10%. When the compound contains chlorine, the amount of the chlorine contains chlorine, the amount of the chlorine present should preferably be between 3–20% by weight of blend and most preferably 5–12%. Representative of such compounds are decabromodiphenyl ether, octabromodiphenyl ether, ethylene bis-(tetrabromophthalimide), brominated polystyrene, poly(dibromophenylene oxide), Dechlorane Plus (the condensation produce of two moles of tetrachlorocyclopentadiene and one mole of cyclooctadiene), and the like. Polymeric retardants may have molecular weight up to 200,000 or more.

The additive system also comprises powdered antimony metal. Such powdered antimony should be of a fine size such as, for example, less than about 500 microns, for complete distribution in the composition. Preferably, the size of the powdered antimony is less than about 150 microns. Powdered antimony metal is commercially available for example, from Alcon Powders and Chemicals, as Alcan 301 antimony powder. The powdered antimony metal should be used in amounts so as to result in about 0.5–5 wt % of the total molding composition.

The phenoxy or poly (hydroxy ether) resins utilized herein are high molecular weight thermoplastic resins which are produced from 2,2-bis(4-hydroxyphenyl) propane and epichlorohydrin according to the procedure described in U.S. Pat. No. 3,356,646, the entire content of which is incorporated herein by reference.

The basic chemical structure of the phenoxy resins is similar to that of epoxy resins. They are, however, a separate and unique resin class, differing from epoxies in at least the following important characteristics.

(a) Phenoxy resins are tough and durable thermoplastics. Their average molecular weight (number average) ranges from 15,000 to 75,000, preferably from 20,000 to 50,000 compared with 240 to 13,000 for conventional epoxy resins which crosslink on polymerization.

(b) Phenoxy resins do not have terminal, highly reactive epoxy groups and are thermally stable materials with along shelf life.

(c) Phenoxy resins can be used without further chemical conversion. For their use, no catalysts, curing agents and/or hardeners are required whereas catalysts, curing agents and/or hardeners are required for the use of epoxy resins.

The phenoxy resins utilized herein can be characterized by a repeating structure according to the formula

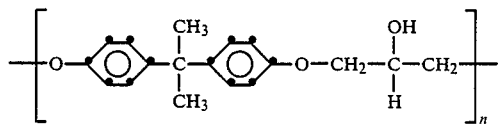

wherein n is about 50 to 200.

The terminal structure is completed with hydrogen atoms or some suitable end capping groups.

The phenoxy resin of the invention does not have terminal, highly reactive 1,2-epoxy groups like the polyepoxide resins described in U.S. Pat. No. 4,357,268. The 1,2-epoxy groups of the epoxy resins are believed to be responsible for the highly benefically effects imparted the polyesters by the polyepoxide resins.

A suitable amount of the phenoxy resin is about 0.5% to 5.0% by weight of the composition. These unique flame retarded reinforced polyesters have unexpectedly superior strength, impact strength and heat deflection temperature which make them ideal for use in electronic components and automotive applications.

The improved polyester resin composition of this invention includes a reinforcing material.

A preferred reinforcing filler is glass fibers which may be introduced into the composition as chopped glass fibres or continuous glass fiber rovings in amounts of about 15–55% by weight of the composition. Other reinforcing materials such as metal fibers, graphite fibers, aramid fibers, glass beads, aluminum silicate, asbestos, mica, talc and the like may be used in combination with, or in place of the glass fibers.

Substantially any of the types of glass fibers generally known and/or used in the art are useful in the present invention. Typical types are those described in British Pat. No. 1,111,012, U.S. Pat. No. 3,368,995 and German Auslegeschrift No. 2,042,447. Thus, the average length of useful fibers covers a wide range, for example, about 1.16 to about 2 inches. The presently preferred glass fibers have an average length of about 1.16 to about ¼ inch.

Glass filaments made of calcium-aluminum-boron silicate glass, which is relatively free from sodium carbonate, are preferably used. Glass of this type is known as "E" glass; however, where the electrical properties of the reinforced polyesters are not important, other glasses can also be used, for example the glass with a low sodium carbonate content which is known as "C" glass. The diameters of the filaments can be in the range from about 0.003 to 0.018 mm, but this is not critical for the present invention.

The length of the glass filaments and whether they have been spun to give fibers and the fibers in turn have been bundled to give yarns, ropes or hanks or woven to give mats and the like to not critical for the invention.

In addition to the components discussed hereinabove, the blends of this invention may contain additives commonly employed with polyester resins, such as colorants, mold release agents, antioxidants, tougheners, nucleating agents, crystallization aids, plasticizers, ultraviolet light and heat stabilizers and the like. Stabilizers such as Irganox 1010 and/or Weston WX 619 in amounts of up to about 2%, preferably about 0.1-05% by weight of the composition, are preferred.

The blends of this invention are prepared by blending the components together by any convenient means to obtain an intimate blend. Compounding temperatures must be at least the melting point of the PCT. For example, the polyester can be mixed dry in any suitable blender or tumbler with the other components an the mixture melt-extruded. The extrudate can be chopped. If desired the reinforcing material can be omitted initially and added after the first melt extrusion, and the resulting mixture can then be melt extruded. The product is especially suitable as an injection molding material for producing molded articles.

The following examples are submitted for a better understanding of the invention.

EXAMPLE 1

The following compositions (all values in wt %) were prepared by compounding in a twin screw extruder at a metal temperature of 300° C. Test bars were injection molded using a melt temperature of 300° C. and a mold temperature of 125° C. Results are shown in Table I.

| | Composition A (control) |
|---|---|
| 52.75% | PCT (I.V. 0.77) |
| 30% | Glass fiber (Owens Corning 419AA, ⅛ inch) |
| 3% | Antimony oxide ($Sb_2O_3$) |
| 10% | Poly(dibromophenylene oxide) (PO-64P, Great Lakes Chemical) |
| 3.75% | Neopentyl glycol dibenzoate |
| 0.25% | Irganox 1010 stabilizer |
| 0.25% | Weston WX 619 stabilizer |
| | Composition B (invention) |

| | Same as Composition A except containing |
|---|---|
| 49.75% | PCT |
| 1% | Antimony metal |
| 2% | Phenoxy resin |
| | Composition C (comparative) |
| | Same as Composition A except containing |
| 50.5% | PCT |
| 5% | Neopentyl glycol dibenzoate |
| 1% | Antimony metal |
| | Composition D (comparative) |
| | Same as Composition A except containing |
| 50.75% | PCT |
| 2% | Phenoxy resin |

From Table I, it is evident that Composition A has the desired flame resistant properties (VO rating), but it has low tensile strength, low flexural strength, and low Izod impact strength. These reduced mechanical properties would make the composition unsuitable for many applications.

Unexpectedly, composition B has flame-resistance as high as Composition A but with much improved mechanical properties. The increased tensile, flexural and impact strengths of Composition B make this material a useful and competitive molding plastic.

Also shown in Table I are properties of Composition A modified with only one of the extra additives in Composition B (either the antimony metal or the phenoxy resin). Addition of antimony alone does not significantly improve the strength properties (Composition C). Addition of phenoxy resin along (Composition D) improves the strength properties but causes a very undesirable decrease in the heat deflection temperature (from 260° C. to 246° C.). This decrease in heat deflection temperature is unacceptable for the applications in which GFR PCT will be used.

The data of Table I demonstrate that only Composition B yields the desired results.

TABLE I

| | Composition | | | |
|---|---|---|---|---|
| | A (Control) | B | C (Control) | D (Control) |
| Tensile Strength, psi (ASTM D638) | 14,000 | 18,400 | 15,400 | 17,500 |
| Flexural Strength, psi (ASTM D790) | 20,000 | 24,900 | 20,000 | 23,200 |
| Notched Izod Impact, ft-lb/in. (ASTM D256) | 1.5 | 1.9 | 1.7 | 2.0 |
| Unnotched Izod Impact, ft-lb/in. (ASTM D256) | 4.9 | 9.2 | 6.0 | 9.6 |
| Heat Deflection Temperature, 264 psi, °C. (ASTM D648) | 260 | 259 | 260 | 246 |
| UL Subject 94 Flammability, 1/16 inch bar | VO | VO | VO | VO |

EXAMPLE 2

Comparative

The following are comparative examples demonstrating that another common antimony compound used for flame retardancy, sodium antimonate, does not give the desired combination of properties when used in the same mixture as antimony oxide. Compounding and molding conditions are the same as used in Example 1.

| | Composition E |
|---|---|
| 49.75% | PCT |
| 30% | Glass fiber |
| 4% | Sodium antimonate |
| 12% | Poly(dibromophenylene oxide) |
| 3.75% | Neopentyl glycol dibenzoate |
| 0.25% | Irganox 1010 stabilizer |
| 0.25% | Weston WX 619 stabilizer |
| | Composition F |
| | Same as Composition E except containing |
| 47.75% | PCT |
| 2% | Phenoxy resin |
| | Composition G |
| | Same as Composition E except containing |
| 48.5% | PCT |
| 2% | Sodium antimonate |
| 2% | Antimony metal |
| 5% | Neopentyl glycol dibenzoate |
| | Composition H |
| | Same as Composition E except containing |
| 46.75% | PCT |
| 1% | Antimony metal |
| 2% | Phenoxy resin |

From Table II, it is evident that none of these compositions containing sodium antimonate gives the high levels of properties required for a flame retarded PCT. In particular, it should be noted that the heat deflection temperatures are all low when sodium antimonate is used in the formulation. This is unacceptable and further demonstrates the unobviousness of the results obtained with the combination of antimony oxide, antimony metal and phenoxy resin.

TABLE II

| | Composition | | | |
|---|---|---|---|---|
| | E | F | G | H |
| Tensile Strength, psi (ASTM D638) | 16,500 | 18,900 | 16,600 | 18,900 |
| Flexural Strength, psi (ASTM D790) | 23,500 | 26,500 | 24,400 | 26,500 |
| Notched Izod Impact, ft-lb/in. (ASTM D256) | 1.1 | 1.2 | 1.5 | 1.3 |
| Unnotched Izod Impact, ft-lb/in. (ASTM D256) | 8.2 | 10.8 | 8.9 | 10.8 |
| Heat Deflection Temperature, 264 psi, °C. (ASTM D648) | 246 | 240 | 250 | 250 |
| UL Subject 94 Flammability, 1/16 inch bar | VO | VO | VO | VO |

The reinforcement may be either glass fiber or a mixture of glass fiber with other fillers or reinforcements. A preferred system for low warpage compositions is to replace some of the glass fiber with mica (normally about 5 to 15 wt % mica based on the weight of the entire composition). The glass fiber is chopped strand of lengths varying from about 1/16 inch to about 2 inches. Lengths of 1/16 to ¼ inch are preferred.

To improve processability and allow the composition to be molded into molds at lower temperatures, it is desirable to incorporate certain processing aids into the composition. Such processing aids may be present at concentrations of about 1 to 10 wt %. Particularly preferred plasticizers are low molecular weight organic esters such as neopentyl glycol dibenzoate (preferred concentration 2-5 wt %) or primary linear alcohols of 30 to 50 carbon atoms, preferred concentration about 0.5-3 wt %.

The compositions preferably include stabilizers. A combination of an antioxidant such as Irganox 1010 (01.1-0.5 wt %) and a phosphite such as Weston WX 619 (0.1-0.5 wt %) is preferred. Other stabilizers, colorants, lubricants, etc. may also be incorporated into the composition.

Reinforced PCT has an unusually high heat deflection temperature, making it useful as an injection molding material especially for applications in the automotive and electronics industries. In addition, flame retardancy is often required for electronics and other applications. The compositions of this invention are particularly suitable for these applications, among which are injection molded circuit boards (molded wiring devices) and connectors.

Examples 3–13 are further modifications of the invention illustrated by Composition B, modifying one of the components of the composition and holding the other components the same, except for adjusting the PCT level to make up 100% by weight. The flammability of each has a VO rating. ASTM tests are as described above.

EXAMPLE 3

The antimony oxide level was decreased to 2.5%. The antimony metal level was increased to 2%. Properties were unchanged from those of Composition B.

EXAMPLE 4

The antimony oxide level was increased to 7.5%. Mechanical properties obtained were tensile strength 17,900 psi, flexural strength 22,000 psi, notched Izod impact 1.7 ft-lb/in. unnotched Izod impact 8.5 ft-lb/in., and heat deflection temperature 260° C.

EXAMPLE 5

The poly(dibromophenylene oxide) level was decreased to 6%. The fiberglass level was increased to 50%. The tensile strength was 22,000 psi, flexural strength 32,000 psi, notched Izod impact 2.5 ft-lb/in., unnotched Izod impact 13 ft-lb/in., and the heat deflection temperature 260° C.

EXAMPLE 6

The poly(dibromophenylene oxide) level was increased to 18%. The tensile strength was 18,000 psi, the flexural strength was 23,900 psi, the notched Izod impact strength was 1.8 ft-lb/in., the unnotched Izod impact strength was 8.9 ft-lb/in., and the heat deflection temperature was 259° C.

EXAMPLE 7

The antimony metal level was decreased to 0.75%. Properties were the same as obtained for Composition B.

EXAMPLE 8

The antimony metal level was increased to 4.5%. Properties were the same as for Composition B except the notched Izod impact strength was 1.7 ft-lb/in. and the unnotched Izod impact strength was 8.7 ft-lb/in.

EXAMPLE 9

The phenoxy resin level was decreased to 1%. The following mechanical properties were obtained: tensile strength 17,000 psi, flexural strength 23,000 psi, notched Izod impact strength 1.7 ft-lb/in., unnotched Izod impact strength 8.5 ft-lb/in., and heat deflection temperature 260° C.

EXAMPLE 10

The phenoxy resin level was increased to 4%. The following mechanical properties were obtained: tensile strength 18,000 psi, flexural strength 24,000 psi, and heat deflection temperature 255° C. Impact strengths were the same as for Composition B.

EXAMPLE 11

Neopentyl glycol dibenzoate, Irganox 1010 stabilizer and Weston WX 619 stabilizer were deleted. The composition was molded into a 140° C. mold and properties were unchanged from those shown for Composition B.

EXAMPLE 12

The glass fiber level was decreased to 20%. The antimony oxide level was increased to 4.5% and the poly(dibromophenylene oxide) level was increased to 15%. The mechanical properties obtained were: tensile strength 16,100 psi, flexural strength 21,600 psi, notched Izod impact strength 1.6 ft-lb/in., unnotched Izod impact strength 7 ft-lb/in., and heat deflection temperature 258° C.

EXAMPLE 13

The glass fiber level was increased to 50%. Properties were the same as in Example 5.

The term "UL Subject 94 Flammability" is a standard Underwriter's Laboratory test well known to those skilled in the art. A rating of "VO" means that a flame will self-extinguish within 10 seconds after each ignition without dripping molten polymer.

Where tests for mechanical properties are not identified, they are the same as specified in Tables I and II.

Unless otherwise specified, all parts, percentages, ratios, etc. are by weight.

I.V. is measured at 25° C. using 0.50 gram of polymer per 100 ml of a solvent consisting of 60 percent by weight phenol and 40 percent by weight tetrachloroethane.

While the invention has been described in detail with particular reference to preferred embodiments thereof, it will be understood that variations and modifications can be effected within the spirit and scope of the invention.

What is claimed is:

1. A flame-retarded polyester molding composition having improved physical properties comprising
  (a) a polyester having repeat units from terephthalic acid and 1,4-cyclohexane-dimethanol and having an I.V. of about 0.5-1.0, and
  (b) an additive system comprising
    (1) about 2-8%, based on the weight of the composition, of antimony oxide,
    (2) about 0.5-5%, based on the weight of the composition, of powdered antimony metal having a particle size of less than 500 microns,
    (3) about 5-20%, based on the weight of the composition, of an aromatic organic compound having at least one aromatic ring in which the compound has sufficient halogen bonded directly to the aromatic ring to provide flame retardant properties, and
    (4) about 0.5-5% by weight of the composition of a phenoxy resin having the formula

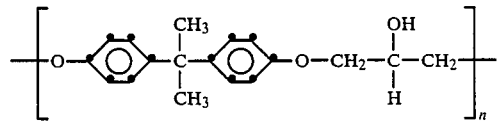

wherein n is about 50 to 200.

2. The polyester molding composition according to claim 1 wherein said composition contains about 15-55% by weight glass fibers.

3. The polyester molding composition according to claim 1 wherein said composition contains about 2-7% by weight neopentyl glycol dibenzoate or ethylene glycol dibenzoate.

4. The polyester molding composition according to claim 2 wherein said composition contains about 2-7% by weight neopentyl glycol dibenzoate or ethylene glycol dibenzoate.

5. The polyester molding composition according to claim 1 wherein said polyester contains at least 90 mol % repeat units from terephthalic acid and at least 90 mol % repeat units from 1,4-cyclohexanedimethanol, wherein the total dicarboxylic acid component is 100 mol % and the total glycol component is 100 mol %.

6. A molded article comprising the composition of claim 4.

7. The polyester molding composition according to claim 1 wherein said composition contains about 0.5-3% by weight of a primary linear alcohol of 30-50 carbon atoms.

8. The polyester molding composition according to claim 2 wherein said composition contains about 0.5-3% by weight of a primary linear alcohol of 30-50 carbon atoms.

* * * * *